United States Patent
Lee et al.

(10) Patent No.: US 6,849,678 B1
(45) Date of Patent: Feb. 1, 2005

(54) POLYMERIZATION, COMPATIBILIZED BLENDING, AND PARTICLE SIZE CONTROL OF POWDER COATINGS IN A SUPERCRITICAL FLUID

(75) Inventors: Sunggyu Lee, Columbia, MO (US); H. Bryan Lanterman, Columbia, MO (US); Paul Pettit, Jr., Strongsville, OH (US); Kathy L. Fullerton, Cuyahoga Falls, OH (US)

(73) Assignee: The University of Akron, Akron, OH (US)

( * ) Notice: Subject to any disclaimer, the term of this patent is extended or adjusted under 35 U.S.C. 154(b) by 139 days.

(21) Appl. No.: 10/042,488

(22) Filed: Jan. 8, 2002

Related U.S. Application Data

(62) Division of application No. 09/148,364, filed on Sep. 4, 1998, now Pat. No. 6,340,722.

(51) Int. Cl.$^7$ .................................................. C08K 3/28
(52) U.S. Cl. ....................... 524/428; 524/429; 524/904; 525/934; 209/1; 209/47; 209/54
(58) Field of Search ................................. 524/428, 429, 524/904, 934; 209/1, 47, 54

(56) References Cited

U.S. PATENT DOCUMENTS

| | | | |
|---|---|---|---|
| 5,328,972 A | * | 7/1994 | Dada et al. .................. 526/227 |
| 5,487,965 A | * | 1/1996 | Odell ..................... 430/137.22 |

* cited by examiner

*Primary Examiner*—Peter D. Mulcahy
(74) *Attorney, Agent, or Firm*—Roetzel & Andress

(57) ABSTRACT

The current process for producing powder coatings can be replaced with a process utilizing supercritical fluids including polymer polymerization, compatibilized blending of powder coating ingredients, and particle size control and classification of the powder coating. Traditionally, powder coating resins are polymerized in solvent based system. Next, the resin is blended with additives in a twin screw extruder at high temperatures. The material is then ground and separated by particle size to form the finished powder coating. This invention replaces the previous process by performing all operations in a supercritical fluid, preferably, carbon dioxide. Polymerization is conducted at any pressure above critical pressure and temperature above critical temperature up to 190°C. Solubility of the polymer in the supercritical fluid allows for control and narrow distribution of the molecular weight and a polydispersity of about 2 or less. Compatibilized blending is effected by a chemical or a physical technique to encapsulate the powder coating additives in the polymer. Particle size control is effected by stepwise controlled depressurization of the mixing chamber or through controlled depressurization of the material into one or more chambers. The advantages are reduction in the number of processing stages, compatibility between processing stages, utilization of lower temperature free radical initiators for polymerization, small batch capability for blending versus set size extruders, utilization of lower temperature cross-linking agents, no fusing, no curing, more homogeneous blending of powder coating ingredients, increased particle size control, and improved gloss and strength of the powder coating.

13 Claims, No Drawings

POLYMERIZATION, COMPATIBILIZED BLENDING, AND PARTICLE SIZE CONTROL OF POWDER COATINGS IN A SUPERCRITICAL FLUID

This application is a division of application Ser. No. 09/148,364, filed Sep. 4, 1998 now U.S. Pat. No. 6,340,722.

TECHNICAL FIELD

The present invention relates generally to the preparation of powder coatings, and more particularly, to the preparation of powder coatings by polymerizing the base polymer resin and blending the powder coating materials in a supercritical fluid. By using a supercritical fluid as the solvent throughout the initial polymerization process, the molecular weight range of the base polymer resin can be controlled and a polymer base resin having a polydispersity of about 2 or less can be obtained. By blending the powder coating materials in the supercritical fluid medium, a more homogeneously blended powder coating can be obtained. The process further provides for more effective control of the particle size of the powder coatings initially dissolved in the supercritical fluids.

BACKGROUND OF THE INVENTION

Powder coatings are polymer materials blended with other additives used to coat various substrates. Such powder coatings are today used in a variety of industries to provide protective barriers to the substrates that they coat. Powder coatings are particularly desirable today because they are environmentally friendly. They are typically applied without the use of toxic solvents, and overspray material from the application process can be reused because it has not been cured onto the substrate. To form optimum powder coatings, it is generally necessary to use polymers which have narrow molecular weight distributions. This, in turn, provides the polymer with a small polydispersity. It is also necessary to attempt to keep the polymer from curing prior to being used as a coating. In other words, it is important that minima cross-linking take place during the blending of the coating materials. Finally, it is highly desirable that the resultant powder coating produced have a narrow particle size distribution on the order of about 15 to 40 $\mu$m.

Historically, powder coatings have been made by a multiple stage process in which each stage is a unique and separate operation. First, the polymer or base resin is polymerized in a solvent based reaction. The solvent is recovered, leaving a dry resin. Typical resins used to make powder coatings may include, but are not necessarily limited to, epoxy, polyester, acrylics, and mixtures thereof.

Next, the resin is premixed, to facilitate homogeneous mixing, with a cross-linking agent and additives such as flow agents, pigments, and interfacial agents, Subsequently, the mixture is processed through a twin screw extruder at approximately 160° C. to form a homogeneous powder coating material. The material is cooled prior to grinding the material into a powder. The powder is finally separated by size into its classification.

The drawbacks to this process are polymerizing a resin with a wider molecular weight distribution and a higher polydispersity (approximately 2.6–3.0). Premature curing caused by the high heat during extrusion is also a problem. Furthermore, the extrusion process does not produce a fully homogeneous dispersion. The high temperature of the extrusion process forces the manufacturer to use high temperature compatible cross-linking agents . Yet another drawback is that grinding produces dust and material losses and consumes energy, and creates a wider particle size distribution. Also, the process requires multiple stages that require large amounts of floor space and are dedicated to operating at a particular batch size.

Wider molecular weight distribution is undesired because the resin is less effective. For a particular application, a target molecular weight for the resin is optimal for that application. As the molecular weight diverges from the target molecular weight, the properties of the resin change and become less optimal. Staying narrowly close to the target molecular weight achieves the desired optimum properties for the resin. Molecular weight of the resin affects adhesion to the substrate and porosity of the coating which, in turn, affects the protection of the substrate. The molecular weight distribution is measured as polydispersity. Polydispersity is the weight average molecular weight divided by the number average molecular weight. As the polydispersity number decreases, the molecular weight distribution becomes narrower and closer to the average molecular weight of the resin. Historically, polydispersity has ranged from 2.6 to 3.0 for resins. Preferably, polydispersity is desired to be about 2 or less.

Analogous to molecular weight is particle size. A targeted particle size is optimal for a given application. As the particle size diverges from the target molecular weight, the properties of the resin change and become less optimal. Particle size affects the porosity of the coating and the ability to protect the substrate and the adhesion of the resin to the substrate.

The selection of cross-linking agents is limited by the high temperatures required for melt blending in an extruder. Cross-linking agents have to be selected that cure at a temperature above the operating temperature of the extruder to prevent premature curing of the cross-inking agent. The premature curing causes the resin to cross-link with itself and reduces the available cross-linking sites that would be available to cross-link with the substrate. This makes for a weaker coating and also reduces the gloss of the resin. Also, the high temperature cross-linking agent requires that high temperatures be used when curing the resin to the substrate. This adds additional energy costs. Lower blending temperatures would permit a larger number of cross-linking agents to be selected based on functionality and costs of the cross-linking agent, and lowers energy costs to cure the resin to the substrate.

Additionally, the extrusion process does not provide a uniform blending. This is because there will be zones of varying temperature which affect the melt of the resin and the fluidity of the melt. Uniform blending is desired to reduce the variation in the powder coating and increase the effectiveness of the additives in the powder coating and the powder coating itself.

The traditional powder coating production process comprises many dissimilar process operations. The first step is polymerizing the resin in a reactor. Once reacted, the resin is separated from its solvent and prepared for extrusion blending. Next, the resin is blended with the additives to make the powder coating material. After blending, the powder coating is processed through a grinder to form particles of a desired size, and finally sorted according to the desired size. Each of these steps is unique and requires different processing equipment. This increases the capital cost of purchasing these various types of equipment and the amount of floor space needed to store the equipment.

Additionally, these pieces of equipment are designed to operate with a predetermined batch size. Particularly, the extruder has a minimum amount of material required to reach a steady state operation. If a small batch of a particular powder coating product is desired, the amount of waste in proportion to the amount of product generated is high as compared to a large batch run. Alternatively, a large batch could be produced; however, storage costs would be incurred storing the excess, and if stored for too long, the quality of the product deteriorates.

Similarly, because of the dissimilarity between the processing steps, material has to be produced and stored from each step before being processed by the next step so that there is a surplus amount of material to continuously feed the process. This adds additional costs to store this intermediate material in terms of warehouse space and environmental controls to maintain the quality of the material.

The use of supercritical fluids as a solvent in various steps of this prior art process is well known. For example, U.S. Pat. No. 5,328,972 to Dada et al. discloses forming a reaction mixture of one or more polymerizable monomers, and a free radical initiator in supercritical carbon dioxide at an elevated temperature of at least 200° C. and an elevated pressure of at least 3,500 psi such that the monomer is present in the reaction mixture at a level below 20% by weight of the supercritical carbon dioxide. This patent also discloses that the process produces polymer products having high purity, molecular weights below 5,000, and polydispersity below 2.5 without resorting to techniques such as chain transfer agents or chain stopping agents.

U.S. Pat No. 4,703,105 to Allada discloses bringing polymerizates into contact with selected gases in nearcritical to supercritical states to inhibit deep polymerization and decomposition while substantially improving residue extraction. It is disclosed that this process enhances the molecular weight distribution of the polymers and results in product containing substantially reduced amounts of low molecular weight components and provides a relatively narrow molecular weight distribution product.

U.S. Pat. Nos. 5,118,530 and 5,063,267 to Hanneman et al. are directed to hydrogen silsesquioxane resin fraction derived from an extraction process using one or more fluids at, near, or above their critical state. The fractions comprise narrow molecular weight fractions with a polydispersity less than about 3.0 or fractions useful for applying coatings on substrates. The process can extract various narrow molecular weight fractions because the sensitivity of the fluids to both temperature and pressure changes allow for accurate control of solvent strength. Once the desired molecular weight fraction has been dissolved in the solvent, it is passed through an area in which the temperature or pressure is changed, such that the fraction is no longer soluble in the extraction fluid, and therefore, precipitates out of solution. The resins are fractionated using a variety of fluids at, near or above their critical point.

U.S. Pat. Nos. 5,252,620 and 5,128,382 to Elliott, Jr. et al. are directed to the preparation of organic microcellular foams prepared by polymerizing directly in a near critical fluid and pursuing the supercritical drying in the same reactor. A critical variable in the choice of a diluent is identified as having a strong enough solvent power to stabilize the power matrix, but a low enough critical temperature to permit critical point drying without damage to the polymer matrix.

U.S. Pat. No. 5,212,229 to Taylor et al. is directed to a coating composition comprising monodispersed acrylic polymer solutions containing supercritical, nearsupercritical, or sub-critical fluids as diluent having a molecular weight that is useful as a polymeric coating vehicle. The process produces acrylic thermoplastic polymers having a molecular weight suitable for use as a coating and a polydispersity of 1 to about 1.5.

U.S. Pat. No. 5,290,827 to Shine discloses the formation of homogeneous polymer blends from thermodynamically immiscible polymers, by dissolving the components in a supercritical fluid and expanding the solution through a fine nozzle.

U.S. Pat. No. 5,412,027 to Shine also discloses the formation of homogeneous polymer blends from thermodynamically immiscible polymers, but includes block or graft copolymers in the group of thermodynamically immiscible polymers. The materials are dissolved on a supercritical fluid and expanded through a fine nozzle.

U.S. Pat. No. 5,487,965 to Odell, discusses a process for preparing a liquid developer composition by dispersing a suspension of polymer resin, colorant, charge director, and hydrocarbon carrier in a supercritical fluid to obtain finely divided colored polymeric particles. Techniques for the compatibilization of the resins or other materials through the use of a supercritical fluid was not disclosed.

U.S. Pat. No. 5,178,325 to Nielsen discloses methods for coating substrates with a coating material and a supercritical fluid. Coating formulations typically include a solids fraction containing at least one component which is capable of forming a coating on a substrate, such as a polymer component (thermoplastic or thermosetting material as well as cross linkable forming systems). A solvent fraction is also employed in order to act as a vehicle in which the solid fraction is transported from one medium to another. A coupling solvent or active solvent may additionally be utilized. The liquid mixture of polymers, a solvent component containing at least one supercritical fluid and optionally active solvent is sprayed onto a substrate to form a liquid coating.

U.S. Pat. No. 5,264,536 to Radosz discloses a supercritical separation process for polymers utilizing mixed solvents. The process can be used to remove light end or heavy end, or generate bulk fractions of low polydispersity. Adding the polymer to the solvent converts the solvent solution to a two phase mixture. The solvent utilized is a multi-component solvent including an anti-solvent being a low capacity component, and a high capacity component. Carbon dioxide is exemplified as an anti-solvent. The polymer to be fractionated is to be contacted with the solvent having two components and a temperature and pressure are chosen so as to determine a different average molecular weight for each fraction according to the selectivity and capacity of the solvent for the desired polymer fractions. Each phase is then separated, and the polymer fractions are separated from the solvent.

U.S. Pat. Nos. 4,582,731, 4,734,227, and 4,734,451 to Smith are directed to the deposition of solid films or the formation of fine powders by dissolving a solid material into a supercritical fluid solution at an elevated pressure, and then expanding rapidly through a heated nozzle into a region of relatively low pressure.

With regard to 4,734,451 patent, thin films are deposited and fine powders are formed utilizing a supercritical fluid injection molecular spray. Individual molecules of very small clusters of the solute are produced, which may then be deposited as a film on any given substrate, or by promoting molecular nucleation or clustering, as fine powder. The primary requirement for fluid injection molecular spray is that materials to be deposited on a suitable precursor must be soluble in the supercritical fluid.

In the 4,734,227 patent, a secondary solvent mutually soluble with the solute and primary solvent and having a higher critical temperature than that of the primary solvent is used in a low concentration to maintain the solute in a transient liquid state. The solute is discharged in the form of long, thin fibers, which are collected at distance sufficient to allow them to solidify in the low pressure region. The process modifies rapid expansion of a supercritical solution containing a polymer solute and an appropriate supercritical solvent so that the solute passes briefly through an intermediate phase, rather than directly to a solid from the solution.

U.S. Pat. Nos. 4,313,737 and 4,364,740 both to Massey et al. disclose a process for treating a hydrocarbonaceous material, such as coal, to separate the solid into a hydrocarbonaceous enriched fraction and a mineral and sulfur enriched fraction. The material is admixed with a low molecular weight alcohol, and the resulting slurry is then heated and pressurized to a supercritical temperature and pressure. Thereafter, the slurry is subjected to a flash expansion to produce selective precipitation and explosive comminution of the components. The product resulting is an admixture of discrete hydrocarbonaceous particles and discrete mineral particles.

U.S. Pat. No. 5,126,058 to Beckman discloses a method for selectively separating commingled materials of different densities by selective density flotation of the materials in a fluid in the vicinity of its critical point. The process is applicable to polymeric waste commingled with other materials, such as wood, paper, metals and glass. It also discuses synthetic polymer waste streams, such as those composed of high and low density polyethylene, polypropylene, polystyrene in foamed and bulk form, polyethyleneterephthalate)PET and (polyvinyl chloride) PVC. A method is disclosed for selectively separating a component material from a mixture of commingled materials of different densities by selective density floatation, comprising the steps of introducing the mixture of commingled materials into a vessel, introducing a fluid into the vessel, the fluid having a range of densities in the vicinity of its critical point such that said fluids density may be set to be between the density of one component of the commingled components and the densities of the remaining components, adjusting the temperature and pressure of the fluid to set the density to selectively float the portion of the materials having a density less than the set density o the fluid, and separating the component which has been selectively divided. The fluid must exhibit the proper density range in the vicinity of its critical point, and should be a poor solvent for the polymers and other materials to be separated.

The art has not addressed the problems, however, of reduction of processing steps, elimination of the grinding stage which produces dust and material loss, compatibility between process stages, having small batch capability of blending powder coating ingredients in existing production equipment, utilization of low temperature cross-linking agents, fusing, curing, achieving increased homogeneous blending, encapsulation as the blending method, achieving a narrow particle size distribution of the powder coating, and producing a powder coating with increased gloss and strength.

SUMMARY OF THE INVENTION

It is an object of the present invention to reduce the number of processing steps in the manufacture of powder coatings.

It is another object of the invention to eliminate the grinding stage from the manufacturing process.

It is another object of the invention to provide compatibility between stages in the manufacturing process.

It is another object of the invention to provide a process that has a reduced environmental impact in that less unreacted monomer and waste solvent are disposed.

It is another object of the invention to provide for small batch capability for the blending of the powder coating ingredients.

It is another object of the invention to utilize lower temperature cross-linking agents.

It is another object of the invention to provide powder coatings that are not used.

It is another object of the invention to provide powder coatings that are not precured.

It is another object of the invention to provide homogeneously blended powder coating materials.

It is another object of the invention to provide powder coating materials wherein the interparticle mixing is achieved by encapsulating.

It is another object of the invention to provide control of the particle size of powder coatings by separating said powder coatings form fluids at supercritical conditions of temperature and pressure utilizing crystallization, precipitation, and renucleation.

It is another object of the invention to provide a powder coating with increased gloss and strength.

It is another object of the invention to provide a polymer for a powder coating with a polydispersity of about 2 or less.

In general, the present invention provides a process for the production of powder coatings in a fluid at least at a supercritical temperature and at least at a supercritical pressure comprising: polymerizing a polymer for a powder coating in a supercritical fluid; compatibilized blending said polymer with additives to form a powder coating in a supercritical fluid; and particle size classifying said powder coating without a grinding stage in a supercritical fluid.

The present invention also provides a process for compatibilized blending of at least one polymer for a powder coating in a supercritical fluid comprising: forming a homogeneously blended powder coating without fusion or curing of the polymer, including compatabilizing the polymer with additives; dispersing the polymer and additives in a fluid at supercritical conditions of temperature and pressure; and releasing the pressure of the fluid to form the blended powder coating.

The present invention also provides a process for particle size classifying a powder coating without a grinding stage in a supercritical fluid comprising: disposing the powder coating in the supercritical fluid; and separating by one of decreasing the supercritical fluid power/density and decreasing the pressure of the supercritical fluid/powder coating system.

The present invention also provides for a powder coating prepared by the process of encapsulating blending of at least one polymer with additives to form a homogeneously blended powder coating without fusion or curing of the polymers, including compatabilizing the polymers, dispersing the polymers in a fluid at supercritical conditions of temperature and pressure, and releasing the pressure of the fluid to form the blended powder coating.

PREFERRED EMBODIMENT FOR CARRYING OUT THE INVENTION

As set forth hereinabove, the present invention is directed toward the use of supercritical fluid in the preparation of powder coatings. That is, the present invention takes advantage of the fact that the entire process for the production of powder coatings, i.e., the polymerization of the base resin in a supercritical fluid, the blending of the polymer and other additives in the supercritical fluid to make the resultant powder coating, and the precipitation or separation of the particles from the supercritical fluid, can be carried out in the same medium, i.e., a supercritical fluid such as, for example, supercritical carbon dioxide.

Supercritical fluids provide benefits to the entire process. First, there is a reduction in the number of processing steps and dissimilarity between steps. This results in a savings of floor space for the equipment and the storage and preparation of material from one stage to the next. In addition, supercritical fluid technology can be utilized in varying batch size allowing for small specialty batches. Supercritical fluids allow for a narrow molecular weight distribution during polymerization and a more homogeneous dispersion during blending. A more homogeneous dispersion is advantageous because it allows the additives to be used more effectively by reducing the amount required which saves money. In particular, pigments are better utilized and allow for improved color matching between batches. Because extrusion is eliminated and the blending occurs at lower temperatures, there is no premature curing of the cross-linking agents or fusion of the polymer particles which reduces the gloss and strength of the powder coating. Similarly, grinding is removed eliminating the production of dust and lost material. Finally, by controlling the depressurization of the supercritical fluid, the particle size of the powder coating can be controlled to a narrow distribution.

There are numerous supercritical fluids which can be utilized in this process including carbon dioxide, ethane, ethylene, propane, propylene, nitrous oxide, water, and ammonia; however, supercritical carbon dioxide provides many benefits over the other types. Carbon dioxide is non-toxic, non-flammable and inexpensive; whereas, ammonia is corrosive and toxic, and ethane and propane are flammable. The supercritical fluid from this process is recovered and reused after each operation.

One or more monomers are reacted in the presence of an initiator in the supercritical fluid. Monomers are selected from the group consisting of epoxies, polyesters, acrylics, and mixtures thereof.

Essentially any free radical initiator known in the art to be suitable for the polymerization of the monomer(s) selected for the polymer resin can be employed. Such free radical initiators may be selected from the group consisting of azobisisobutyronitrile (AIBN), peroxides such as benzoyl peroxide, and t-amyl perbenzoate. Tertiary-amyl perbenzoate has an advantage over AIBN in that cyanide generation will not occur. Additionally, t-amyl perbenzoate is less likely to evolve benzene than is benzoyl peroxide. It is believed that the efficiency of free radical initiators is increased because diffusional resistance and cage effects are reduced in the presence of a supercritical fluid as the solvent.

There are a number of supercritical fluids available for use in this process including, but not necessarily limited to, those selected from the group consisting of carbon dioxide, ethane, ethylene, propane, propylene, nitrous oxide, water and ammonia. Preferred among this list of supercritical fluids is carbon dioxide, since it is relatively inexpensive, readily available, non-flammable and non-toxic.

For the production of powder coatings, supercritical carbon dioxide ($SCO_2$) is utilized above its critical temperature (31.4° C.) and above its critical pressure (72.9 atm). Preferably, the reactor temperature ranges from about 32° C. to about 190° C., and more preferably, from about 90° C. to about 100° C. for AIBN and from about 145° C. to about 155° C. for t-amyl perbenzoate. With respect to pressure, the reactor operates within a pressure range from about 73 atm to about 272 atm, preferably from about 105 atm to about 184 atm, and more preferably from about 150 atm to about 177 atm.

It will be appreciated that, because of the solvent power of the supercritical fluid, no stabilizer is required; therefore, no silicon material needs to be introduced into the reactor. Stabilizers containing silicon have traditionally been used in prior art processes; however, silicon is difficult to remove from the resultant polymer resin and reduces the adhesion of the powder coating material to the substrate which it coats.

Monomers suitable for use in the present invention include essentially any polymerizable material capable of coating a substrate as a powder coating. Examples of such suitable monomers include epoxies, polyesters, acrylics, and mixtures thereof.

The polymerization can be batch, semi-batch, or continuous. By changing the temperature and pressure of the supercritical fluid mixture during polymerization, the solvating power of the supercritical fluid can be changed to control the resulting molecular weight of the polymer. As the polymer reaches a certain chain length, its size will no longer be solvent in the supercritical fluid and will precipitate out. Average molecular weights can be controlled in the 6,000 to 8,000 range while achieving a polydispersity of about 2 or less.

In the batch reaction, the initiator is charged to an agitated reaction vessel. Next, the supercritical fluid is added to the reaction vessel and heated and pressurized to a supercritical state of temperature and pressure. Lastly, the monomer is added to the reaction vessel. The polymerization occurs for a select period of time.

In the semi-batch reaction, the supercritical fluid is added to an agitated reaction vessel. The reaction vessel can be heated and pressurized to a supercritical state of temperature and pressure before or after the supercritical fluid is added to the reaction vessel. The reaction is stared by pumping the monomer and the initiator to the reaction vessel. This can be done by initially pumping over a select amount of the monomer and initiator into the reaction vessel and allowing this initial batch react for a select period of time prior to pumping the remaining monomer and initiator into the reaction vessel. Alternatively, no initial batch is pumped into the reactor and the reaction starts with the pumping of the monomer and initiator. The monomer and initiator are pumped into the reaction vessel, through a metering pump, over a select period of time. Reaction is occurring during this metering process. Once the monomer and initiator have been pumped into the reaction vessel, the reaction continues for another select period of time.

Reaction time, for either the batch or semi-batch polymerization, is about 30 minutes to about three hours. When the reaction is complete, the temperature and pressure of the supercritical fluid are stepwise reduced until they are dropped below the critical temperature and critical pressure. At this point, there is no more solvating power so the unreacted monomer separates from the fluid. The fluid and unreacted monomer are then removed from the polymer and separated by changing the temperature and pressure of the supercritical fluid so that it reverts to a gas state. Both the unreacted monomer and fluid are stored for future use. This provides an added environmental benefit in that under traditional solvent polymerization, the unreacted monomer has to be separated from the solvent and eventually the waste solvent has to be disposed. This recovery process requires additional equipment over the supercritical fluid process.

In the continuous reaction, initiator, monomer, and supercritical fluid are continuously fed through a continuous reaction vessel. The reaction vessel and the incoming supercritical fluid are heated and pressurized so that the supercritical fluid is at a supercritical state of temperature and pressure. The reaction proceeds as the supercritical fluid, initiator, and monomer feed through the reaction vessel. Upon discharge from the reaction vessel, the temperature and pressure and reduced below the supercritical point for the supercritical fluid. The polymer resin is collected for processing into a powder coating material. The supercritical fluid, initiator, and unreacted monomer, are recovered and can be recycled back into the feed for the reaction vessel.

For the compatibilized blending, a supercritical fluid is charged with the polymer to a vessel and the temperature and pressure are increased to a point where the supercritical fluid is supercritical. Preferably, the supercritical fluid is carbon dioxide, and preferably the temperature range is about 40° C. to about 70° C. This lower temperature, as compared to 140–160° C. required for the extrusion blending stage, allows for use of low temperature cross-linking agents, and avoids precuring and fusing of the powder coating material which reduces the strength and gloss of the powder coating material.

Additives, such as cross-linking agents, ultraviolet absorbers, light stabilizers, hydroxyketones, flow profile agents, interfacial agents, pigments, silica, surfactants and any other specialty additives as is desired are charged with the polymer into the vessel. The supercritical fluid provides for a better flow and mixing over extrusion because particles are free to move though the fluid as opposed to mixing in a polymer melt in an extruder.

The type of blending that occurs is encapsulating blending. The cross-linking agents and other additives encapsulate, or flow, inside the polymer. As viewed through a sight glass, the blended powder coating material has a wet/melt appearance.

The blending of the polymer into the supercritical fluid can be compatibilized by either a chemical or a physical technique. The chemical compatibilization is achieved by preparing graft copolymers having modified functional groups that increase the solubility or the miscibility of the polymer in the supercritical fluid. Preferably, for maximizing the chemical compatibilization, the graft copolymers have an average molecular weight of about 3,000 to about 6,000. In addition, the graft copolymers may contain carbonyl functional groups to increase the chemical compatibilization with the supercritical fluid. Additionally, cross-linking agents can be selected that have increased compatibility with the supercritical fluid.

The first physical technique involves controlling the starting particle size of the polymer so that the polymer is miscible or soluble in the supercritical fluid.

The second physical technique accomplishes miscibility or solubility by modifying the surface properties of the polymeric resin by mixing the polymer with graft copolymers. Examples of, but not limited to, graft copolymers are polypropylene-graft-maleic anhydride (PP-g-MA), polystyrene-graft-maleic anhydride (PS-g-MA), polystyrene-graft-acrylic acid (PS-g-AA), polypropylene-graft-polystyrene (PP-g-PS), and polyethyleneterephthalate-g-acrylic acid (PET-g-AA).

The third physical technique achieves miscibility or solubility by using selective mixing wherein the polymer, compatibilizers, and other ingredients in the particle size range of from about 10 to about 30 microns are mixed at a low temperature ranging from about 35° C. to about 90° C. in the supercritical fluid.

The last physical technique attains miscibility or solubility by selectively precipitating nuclei from solubilized cross-linking agents into the polymer matrix and subsequently solidifying the polymer by controlled depressurization.

The encapsulating blending in the supercritical fluid allows for the selection of more cross-linking agents because of the lower temperature of blending. In the traditional processing, cross-linking agents were limited to those that have a $T_g$ equal to or greater than the melt temperature of the polymer so that the cross-linking agent would not become precured in the extrusion process. In the supercritical fluid blending process, cross-linking agents can be used which have a lower $T_g$ (glass transition temperature) than those used in the extrusion process. Cross-linking agents can be optimized for lower cost and improved quality. Examples of cross-linking agents that can be used comprise dicarboxylic acids such as dodecanedioc acid and any other cross-linking agents that do not adversely affect the properties of the present invention.

In addition to improvements in cross-linking agents, improvements are obtained for pigments. The encapsulating blending provides a uniform blending of materials; whereas, the extrusion process produces pockets of nonuniformity because of the efficiency of the melting process. Because of the uniformity of encapsulated blending, color matching lots is improved and less pigment is required to achieve the uniform color. This provides an additional cost savings benefit.

Once the powder coating material is blended, the powder coating material is classified by particle size. If not continuing from tile blending stage, the powder coating material is disposed into the supercritical fluid for processing by classification. The disposing in the supercritical fluid is accomplished by dissolving, swelling, or blending the powder coating material into the supercritical fluid.

Once the powder coating material is disposed in the supercritical fluid, there are three methods to classify the powder coating by particle size distribution. The first method utilizes a stepwise reduction in temperature and pressure to effect a reduced solubility of the powder coating material in the supercritical fluid. First, the temperature and pressure are reduced, but they are still above critical. Next, the temperature is dropped below critical, and the pressure is dropped, but is still above critical. Finally, the pressure is dropped below critical which reduces the solubility of the powder coating material in the supercritical fluid to zero. The stepwise reduction in solubility allows the powder coating to precipitate out of the supercritical fluid under controlled conditions so that a uniform particle size and narrow particle size distribution is achieved. Additionally, the stepping down of the pressure prevents rapid expansion and foaming of the powder coating material as would occur if the pressure was dropped to below critical on the first step. This leads to improved quality and control of the powder coating material.

The second method utilizes a striker chamber. The powder coating material is transported by pressure from its blending chamber though an orifice to a second chamber known as the striker chamber. The striker chamber has a vertical plate mounted inside the chamber in front of the orifice. The incoming powder coating material stream impacts on the vertical plate causing a reduction in the solubility. After impacting the vertical plate, the powder coating material stream subsequently impacts onto a horizontal plate that is mounted beneath the vertical plate and then impacts onto a second vertical plate mounted adjacent to the horizontal plate. The impacts cause the powder coating material to precipitate out of the supercritical fluid. By controlling the flow rate and pressure drop in the striker chamber, the formation and control of particle size and particle size distribution is achieved.

The third method utilizes one or more orifice openings between two chambers. The powder coating material starts in one chamber and passes through an orifice to a second chamber. Control is effected by selecting the size of the orifice to the desired particle size of the powder coating material. Preferably, the particle size of the powder coating material is about 25 μm. By controlling the change in pressure between the two chambers the particle size and particle size distribution is achieved.

The fourth method of particle size control involves controlled precipitation through either temperature and/or pressure change. At a given condition of temperature and pressure, the powder coating material is soluble in the supercritical fluid. By reducing the temperature, pressure, or the temperature and pressure to subcritical or reduced supercritical conditions, an insoluble state can be created. The powder coating material will then precipitate out once reaching this insoluble condition. The process is then returned to a supercritical state of temperature and pressure causing the redissolution of some of the powder coating particles, with the smaller powder coating particles dissolving completely as controlled by the supercritical conditions of temperature and pressure. When the temperature, pressure, or the temperature and the pressure is again reduced, the powder coating particles which had not dissolved grow at a faster rate than the newly formed and the redissolved powder coating particles. The growth of these precipitated powder coating particles can be controlled by raising and lowering the temperature, pressure, or both the temperature and the pressure of the process.

The resultant powder coating produced in a supercritical fluid meet or exceed the product test specifications set for powder coatings produced by the prior art method. The tests for powder coatings comprise: Gel Time, GPF (gel plate flow), Impact, Mar, Gloss, and Hardness. In addition, the $T_g$ of the polymer resin is closer to the original $T_g$ as compared to powder coatings produced by prior art methods because the polymer has not been precured as happens in prior art powder coating production. Also, the $T_M$ (melt temperature) of the cross-linking agent is closer to the original $T_M$ as compared to powder coatings produced by prior art methods because the cross-linking agent has not been precured.

EXPERIMENTAL EXAMPLES

In order to demonstrate practice of the invention, the following non-limiting examples illustrate embodiments of the invention and the present invention is not limited thereto.

Example 1

(Blending)

Two clear acrylic powder coating materials were prepared with the same ingredients. Each powder coating material formulation contained methacrylate copolymer, a dicarboxylic acid cross-linking agent (dodecanedioc acid), ultraviolet absorber (2-(2H-benzotriazol-2-yl-4,6bis(1-methyl-1-phenylethyl)phenol), flow modifier (ethyl acrylate and 2-ethylhexyl acrylate copolymer on silica carrier), light stabilizer (bis(1,2,2,6,6-pentamethyl4-piperidinyl)(3,5-di-tert-butyl-4-hydroxybenzyl)butylpropanedioate), hydroxyketone (benzoin), surfactant (di(cocoalkyl)methylamines), and hydrophilic silica (silicon dioxide). The first powder coating was prepared by the conventional prior art method of extrusion blending. The second powder coating was prepared utilizing the supercritical fluid (carbon dioxide) process of the present invention. The procedure for the supercritically prepared powder coating material was as follows:

1) Loading of approximately 30–60g of the powder coating formulation into a 300 ml stainless steel reactor vessel with carbon dioxide.
2) Pressuring and heating the reactor vessel to 3000 psi and 46° C.
3) Agitating the reactor vessel for 30 minutes with a magnetically driven impeller.
4) Depressurizing the reactor vessel to below supercritical pressure and allowing the reactor vessel to cool.

The small batch size of the laboratory reactor vessel required that several batches be added together to have sufficient quantity for performing all of the laboratory testing. The powder coating material was also sprayed onto a panel and then cured into a film. The results are listed in Table 1.

TABLE 1

| Test | Prior Art Process | Supercritical Fluid Process |
|---|---|---|
| Gel Time (375° F.), sec. | 30 | 29 |
| GPF (0.6 g) | 154 | 180 |
| Impact (D) | 20 | 20 |
| Mar, gloss retention, % | 45 | 35 |
| Hardness, knoops | 14.8 | 15.8 |
| Gloss (20/60), % | 85/92 | 51/84 (85/92)* |
| $T_g$ of the resin, ° C. | 50.21 | 56.07 |
| $T_M$ of the cross-linking agent, ° C. | 106.00 | 114.03 |
| $T_g$ of the cured film, ° C. | 57.86 | 61.72 |

*The lower gloss of the powder coating from the supercritical fluid process resulted from the mixing of the several batches. An analysis of a single batch, in parentheses above, showed a gloss approximately equal to the gloss of a powder coating manufactured in the prior art process.

The initial $T_g$ of the raw polymer resin is 55.23° C., and the initial $T_M$ of the cross-linking agent is 122.21° C. When the raw polymer resin and the cross-linking agent are mixed in an extruder, the close contact at the elevated temperatures causes a reaction to occur. Additionally, the high degree of mixing causes the subsequent depression in the $T_g$ and $T_M$. In the supercritical fluid process of the present invention, the $T_g$ and TM reduction is less which demonstrates a different degree of mixing of the powder coating materials. This lesser degree of intermolecular mixing does not diminish the properties of the final product as evidenced by the fact that all of the results in the other test categories meet or exceed the results of the powder coating material produced in the prior art method. The higher GPF also indicates that a reduced amount of reaction has occurred between the raw polymer resin and the cross-linking agent in the mixing stage.

Example 2

(Polymerization)

The following semi-batch procedure was used to copolymerize a polymer of methyl methacrylate and glycidal methacrylate.

1) An agitated, one liter reaction vessel is heated and pressurized to approximately 150° C. and 2200 psi.

2) A liquid mixture of the two monomers, methyl methacrylate and glycidal methacrylate, as well as the initiator, t-amyl perbenzoate, is pumped (semi-batched) into the reaction vessel using an eldex liquid pump in approximately one hour.
3) The reaction continues for approximately 1.5 hours after the mixture is pumped into the reaction vessel.
4) The reaction vessel is then cooled.
5) The reaction vessel is then depressurized and the polymer resin product is collected.

Table 2 illustrates the gel permeation chromatography results for the polymer.

TABLE 2

| Run | Monomer Loading (ml) | Pressure psi | $M_w$ | Polydispersity |
|-----|----------------------|--------------|-------|----------------|
| 1   | 250                  | 2220–2647    | 7360  | 2.1            |
| 2   | 273                  | 2259–2668    | 7690  | 2.0            |

These experiments demonstrate the low polydispersity of about 2 that is obtainable by this process.

Thus it should be evident that the device and methods of the present invention are highly effective in the use of a supercritical fluid for polymerizing a polymer resin and then formulating the polymer resin into a powder coating material. The devices and methods of the present invention can be used separately with other equipment, methods and the like, as well as for the manufacture of other materials.

Based upon the foregoing disclosure, it should now be apparent that the production of powder coatings in a supercritical fluid as described herein will carry out the objects set forth hereinabove. It is, therefore, to be understood that any evident variations fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A process for the compatibilized blending of at least one polymer for a powder coating in a supercritical fluid comprising:
   forming a homogeneous blended powder coating without fusion or curing of the polymer, including compatibilizing the polymer with additives;
   dispersing the polymer and additives in a fluid at supercritical conditions of temperature and pressure; and
   releasing the pressure of the fluid to form the blended powder coating, wherein said compatibilizing is achieved by one of
   a. preparing graft copolymers having modified functional groups and preferably an average molecular weight of about 3,000 to about 6,000 to increase one of solubility and miscibility in the supercritical fluid;
   b. selecting a cross-linking agent to increase one of solubility and miscibility in the supercritical fluid;
   c. controlling starting particle size;
   d. modifying interfacial properties to promote intraparticle fusion;
   e. using selective mixing; and
   f. using controlled depressurization.

2. A process according to claim 1 wherein said supercritical fluid is one of carbon dioxide, ethane, ethylene, propane propylene, nitrous oxide, water and ammonia.

3. A process according to claim 1, wherein the supercritical fluid is carbon dioxide at supercritical conditions of temperature in a range above the critical temperature (31.4° C.) up to about 190° C., and pressure above the critical pressure (72.9 atm).

4. A process according to claim 1, wherein said additives comprise cross-linking agents, ultraviolet absorbers, light stabilizers, hydroxyketones, flow modifiers, silicas, surfactants, pigments, and mixtures thereof.

5. A process according to claim 1 wherein the graft copolymers contain carbonyl functional groups to increase one of solubility and miscibility in the supercritical fluid.

6. A process according to claim 1 including swelling of said blended powder coating, and effecting a semimelt phase of blending and interparticle mass transfer.

7. A process for particle size classifying a powder coating without a grinding stage in a supercritical fluid comprising:
   disposing the powder coating in the supercritical fluid; and
   separating by one of decreasing the supercritical fluid power/density and decreasing the pressure of the supercritical fluid/powder coating system, wherein said particle size is controlled by one of
   a. stepwise changes in temperature and pressure of the supercritical fluid comprising;
      reducing the temperature and pressure of the supercritical fluid but remaining above the supercritical temperature and supercritical pressure;
      reducing the temperature below the supercritical temperature and dropping the pressure but remaining above the supercritical pressure;
   b. passing the supercritical fluid/powder coating from the blending chamber through an orifice into a striker chamber with a first vertical plate mounted inside the striker chamber in front of the orifice and with a horizontal plate mounted under the vertical plate and with a second vertical plate mounted adjacent to the horizontal plate with the supercritical fluid/powder coating impacting on the first vertical plate then the horizontal plate and then on the second vertical plate; and
   c. changing the fluid from supercritical, to subcritical, and then to supercritical, thereby inducing dissolution/swelling precipitation/renucleation of said powder coating.

8. A process according to claim 7 wherein said supercritical fluid is one of carbon dioxide, ethane, ethylene, propane, propylene, nitrous oxide, water and ammonia.

9. A process according to claim 7 wherein the supercritical fluid is carbon dioxide at supercritical conditions of temperature in a range above the critical temperature (31.4° C.) up to about 190° C., and pressure above the critical pressure (72.9 atm).

10. A process according to claim 7 wherein said disposing is dissolving said powder coatings in fluids at supercritical conditions of temperature and pressure.

11. A process according to claim 7 wherein said disposing is swelling said powder coatings in fluids at supercritical conditions of temperature and pressure.

12. A process according to claim 7 wherein said disposing is blending said powder coatings in fluids at supercritical conditions of temperature and pressure.

13. A process according to claim 7 wherein changing the fluid phase from supercritical, to subcritical, and then to supercritical is effected by one of changing temperature at constant pressure, changing pressure at constant temperature, and changing temperature and pressure.

* * * * *

UNITED STATES PATENT AND TRADEMARK OFFICE
CERTIFICATE OF CORRECTION

PATENT NO. : 6,849,678 B1
DATED : February 1, 2005
INVENTOR(S) : Lee et al.

It is certified that error appears in the above-identified patent and that said Letters Patent is hereby corrected as shown below:

Column 13,
Line 66, "propane" should read -- propane, --

Signed and Sealed this

Seventeenth Day of May, 2005

JON W. DUDAS
*Director of the United States Patent and Trademark Office*